US012281819B2

(12) United States Patent
Mann

(10) Patent No.: US 12,281,819 B2
(45) Date of Patent: Apr. 22, 2025

(54) ELECTRIC FLUID FLOW HEATER WITH HEATING ELEMENTS STABILIZATION FINS

(71) Applicant: Kanthal GmbH, Düsseldorf (DE)

(72) Inventor: Markus Mann, Düsseldorf (DE)

(73) Assignee: Kanthal GmbH, Mörfelden-Walldorf (DE)

( * ) Notice: Subject to any disclaimer, the term of this patent is extended or adjusted under 35 U.S.C. 154(b) by 845 days.

(21) Appl. No.: 17/439,751

(22) PCT Filed: Mar. 23, 2020

(86) PCT No.: PCT/EP2020/058015

§ 371 (c)(1),
(2) Date: Sep. 15, 2021

(87) PCT Pub. No.: WO2020/193479

PCT Pub. Date: Oct. 1, 2020

(65) Prior Publication Data

US 2022/0178584 A1 Jun. 9, 2022

(30) Foreign Application Priority Data

Mar. 25, 2019 (EP) .................................... 19164790

(51) Int. Cl.
*F24H 9/18* (2022.01)
*F24H 1/14* (2022.01)
(Continued)

(52) U.S. Cl.
CPC ............... *F24H 9/18* (2013.01); *F24H 1/142* (2013.01); *F24H 3/002* (2013.01); *F24H 9/0021* (2013.01);
(Continued)

(58) Field of Classification Search
None
See application file for complete search history.

(56) References Cited

U.S. PATENT DOCUMENTS 3,961,741 A * 6/1976 Klein .................. B23K 9/0325 228/144
6,442,341 B1 8/2002 Wu
(Continued)

FOREIGN PATENT DOCUMENTS

EP 2926623 B1 6/2016
GB 2616537 A * 9/2023 ............ F24H 1/142
(Continued)

OTHER PUBLICATIONS

International Search Report and Written Opinion dated Jul. 10, 2020, issued in corresponding International Patent application No. PCT/EP2020/058015.
(Continued)

*Primary Examiner* — Hung D Nguyen
(74) *Attorney, Agent, or Firm* — Morgan, Lewis & Bockius LLP

(57) ABSTRACT

An electric heater to heat a flow of a fluid having a jacket block comprising a plurality of longitudinal bores to allow the through-flow of a gas phase medium. An elongate heating element extends through each of the bores and is positionally stabilised within the jacket block via a plurality of stabilising fins that project radially inward to at least partially surround the elongate heating element within each of the bores.

24 Claims, 6 Drawing Sheets

(51) Int. Cl.

| | |
|---|---|
| ***F24H 3/00*** | (2022.01) |
| ***F24H 9/00*** | (2022.01) |
| ***F28D 1/053*** | (2006.01) |
| ***F28F 1/02*** | (2006.01) |
| ***F28F 1/40*** | (2006.01) |
| ***F28F 7/02*** | (2006.01) |
| ***H05B 3/40*** | (2006.01) |

(52) U.S. Cl.

CPC ....... *F24H 9/0063* (2013.01); *F28D 1/05383* (2013.01); *F28F 1/022* (2013.01); *F28F 1/40* (2013.01); *F28F 7/02* (2013.01); *H05B 3/40* (2013.01); *F24H 2250/02* (2013.01); *H05B 2203/003* (2013.01)

(56) References Cited

U.S. PATENT DOCUMENTS

| | | | | |
|---|---|---|---|---|
| 9,867,232 | B2 | 1/2018 | Mann et al. | |
| 2011/0129205 | A1* | 6/2011 | Slayton .................. | D06F 39/04 392/488 |
| 2017/0094725 | A1* | 3/2017 | Mann ...................... | H05B 3/48 |

FOREIGN PATENT DOCUMENTS

| | | | |
|---|---|---|---|
| JP | 03-034874 | Y2 | 7/1991 |
| JP | 2017-510021 | A | 4/2017 |
| WO | 2005/006812 | A1 | 1/2005 |
| WO | 2010/106349 | A2 | 9/2010 |
| WO | 2011/066019 | A2 | 6/2011 |
| WO | 2015/128183 | A1 | 9/2015 |

OTHER PUBLICATIONS

Office Action dated Dec. 16, 2024, issued in corresponding Korean Patent Application No. 10-2021-7032402.

* cited by examiner

ELECTRIC FLUID FLOW HEATER WITH HEATING ELEMENTS STABILIZATION FINS

FIELD OF INVENTION

The present invention relates to an electric heater to heat a flow of a fluid and in particular although not exclusively to an electric heater having a jacket block to accommodate a heating element including fins to positionally stabilise and centralise the heating element.

BACKGROUND ART

Electric heaters for heating gases to high temperatures typically include a tube adapted for the through-flow of the gas and an electrical heating element (positioned within the tube) to heat the flowing gas.

Conventionally, relatively fine wires are wound in a spiral configuration within the tube such that the heating effect is achieved by passing current through the wires as the gas flows through the tube. Accordingly, the effectiveness of the conversion of the electrical energy into heat (via the heating wire) depends for example on the available electrical voltage applied and the resistance of the wire. In particular, this conversion to heat energy is dependent on a maximum temperature achievable by the wire, the flow resistance and the surface area available for heat exchange. Typically, maximum gas temperatures that may be achieved by conventional electric process heaters may be of the order or around 700 to 900° C. However, the higher the temperature the greater the tendency for fracture and failure of the wire.

More recently, EP 2926623 discloses an electric flow heater in which the heating wire has a larger cross sectional surface area to provide a desired cross-sectional ratio with the tubular bore through which the rod extends. A single heating element extends through multiple bores (formed within elongate tubular elements) via a plurality of bent (or looped) ends. Gas heating temperatures of up to 1200° C. are described.

Whilst conventional electric flow heaters may be capable of achieving high temperatures of the order of 1100° C., high gas speeds and large pressure differentials cause tension and movement or vibration of the heating element and the surrounding tubes or jacket blocks through which the element extends. The heating element is susceptible to mechanical impact and stress which inevitably results in breakage. This phenomenon is even more pronounced when the elongate tube (jacket block) is orientated vertically where gravitational forces further contribute to the stresses and physical demands on the heating element.

Moreover, to maximise efficiency, the heating element is typically passed through multiple bores within a surrounding elongate jacket block. The element, having U-shaped bent axial end sections, emerges from and returns into adjacent bores at each axial end of the jacket block. Small positional deviation of the heating element, for example resultant from localised temperature variations within the bores, causes displacement of the bent end sections that can lead to the element (at the bend ends) contacting itself. This in turn causes a short circuit and failure of the electric heater. The risk of short circuiting is even greater for some of more recent heaters due to their very fine tolerances. Accordingly, what is required is an electric fluid flow heater that addresses these problems.

SUMMARY OF THE INVENTION

It is an objective of the present invention to provide an electric fluid flow heater which will, independently of the shape of a bore or a channel, provide excellent heating of a fluid, such as a gas. Furthermore, it is an objective of the present invention to provide a flow heater comprising straight rods which will elongate in lengthwise direction (of the fluid flow) which will provide the fluid flow heater with a controlled and efficient heat transfer without being dependent of an annular gap. Additionally, it is an objective to provide a flow heater having a low pressure drop while keeping a uniform heat transfer to the fluid.

It is a further objective of the present invention to provide an electric fluid flow heater to heat a fluid and in particular a gas (gas-phase medium) capable of achieving modest to high temperatures of the order of 700° C., such as up to 900° C., such as up to 1100° C. and potentially up to 1300° C. with minimised physical stress, fatigue and damage to the heating element so as to enhance the heater service lifetime.

It is a further objective to stabilise and centralise the heating element extending within at least one jacket element (that in turn forms an elongate jacket block) such that independent movement of the heating element relative to the jacket element of jacket block is minimised and preferably eliminated.

It is a further specific objective to stabilise the heating element positioned within the jacket block to avoid the heating element contacting itself at bent axial end sections that extend axially beyond the jacket block and longitudinal bores or channels extending through the jacket block.

It is a yet further specific objective to increase the efficiency of thermal transfer between the gas flowing through the jacket element (jacket block and elongate bores or channels) and the heating element to maximise efficiency of the electric heater.

Accordingly, an electric fluid flow heater is provided in which the heating element (at least partially accommodated within a jacket element and/or jacket block), is positionally stabilised internally within the heating element (jacket block) by a set of fins which are both stabilising and centering. Such fins project radially into each bore or channel (through which the heating element passes) so as to sit around the heating element and prevent lateral movement within each respective bore. Additionally, the fins will provide a homogenous temperature distribution because each channel or bore will be centred.

Accordingly, at least three stabilisation fins are provided internally within each bore or channel being the minimum number to achieve sufficient stabilisation and in particular centering of the heating element on the axial centre of each bore or channel. Accordingly, the heating element is prevented from radial (lateral) deviation within each bore or channel which in turn prevents the U-shaped looped ends of the heating element (that extend axially beyond the jacket element, jacket block) from contacting one another that would otherwise provide a short circuit and failure of the electric heater.

The present electric fluid flow heater will due to the fins have more free flow cross sectional area in the fluid flow heaters jacket element and/or jacket block, that typically have a square outer shape, this means that the more area within the electric fluid flow heater can be used for heating of the fluid and also indirect heating of the flow will be possible as heat will be transferred by radiation. Additionally, the fins will also provide for a proper centering of the jacket element and/or jacket block, leading to less exposure to failure, especially in cyclic operation.

According to a first aspect of the present invention that is provided an electric heater to heat a flow of a fluid comprising: at least one axially elongate jacket element defining an axially elongate jacket block having first and second lengthwise ends; a plurality of longitudinal bores or channels extending internally through the jacket block and being open at each of the respective first and second lengthwise ends each of the bores or channels defined by an internal facing surface of the at least one jacket element; at least one heating element extending axially and in particular extending axially straight through the bores or channels and having respective bent axial end sections such that the at least one heating element emerges from and returns into adjacent or neighbouring bores or channels at one or both the respective first and second lengthwise ends, the at least one heating element and the jacket block forming a heating assembly; characterised by: at least three fins projecting radially inward from the at least one jacket element towards the at least one heating element within each of the bores or channels. Thus, the present electric heater will be free-shape meaning that due to the fins, the bores or channels may have any shape and thereby fulfilling the cross sectional area ratio limits as described below.

According to one embodiment, the axially elongated jacket element may be a rod or a wire. According to another embodiment, the axially elongated jacket element has an axially straight alignment of at least 75% of its length. According to another embodiment, the whole elongated jacket element has a straight alignment.

The stabilisation and centering fins and in particular the cross sectional profile of the jacket element that defines each bore is adapted to maximise the efficiency of thermal energy transfer from the heating element to the flowing gas. This is achieved via the internal shape profile of each bore or channel that may be considered to comprise 'lobes' that are, in part, defined by the centering fins. In particular, in a cross sectional plane of the jacket element/jacket block, an internal facing surface of the bore or channel is distanced from an external facing surface of the heating element by a sufficient separation distance to enable the flow of a sufficient volume of gas evenly and uniformly around the heating element. According to one embodiment, the surface area ratio which is defined as the cross sectional area of the heating element divided by the cross sectional area of the bore or channel or cavity is in the rage of from 0.12 to 0.72.

The centering fins therefore provide directing or channeling of the flow of gas uniformly around the heating element. This is advantageous to avoid localised temperature differentials axially along and radially around the heating element that otherwise lead to stress and in particular bending or distortion of the heating element. As will be appreciated, this in turn provides or contributes to lateral displacement of the U-shaped end sections and increases the risk of short circuiting.

Moreover, the available free-flow surface area around the heating element will provide for a uniform and controlled heating and cooling along the cross sectional area of the heating element.

Optionally in a cross sectional plane through the jacket block a radial separation distance between the internal facing surface of each bore or channel and an external facing surface of the at least one heating element is non-uniform between each of the fins in a circumferential direction around the at least one heating element. Preferably, in said cross sectional plane, said separation distance is at a maximum at a position centrally between adjacent fins in a circumferential direction. Such an arrangement is advantageous to maximise the capacity and rate of gas flow through the bores or channels and avoid undesirable localised heating.

Reference within this specification to 'fins' and stabilising fins' and 'centering fins' and stabilising and centering fins' encompass ribs, ridges, splines and projections extending radially inwardly from the body of the jacket element/jacket block towards the heating element and may change its shape in axial direction or even partly disappear.

The fins may be linear or may be curved or bent in their longitudinal direction. Optionally the fins may be helical or part helical along their length. Such an arrangement may assist the control of the flow of gas through the heating assembly and reduce a tendency for localised heating variation along and around the heating element.

Reference within this specification to 'at least one axially elongate jacket element' and 'axially elongate jacket block' encompass a cover, a sleeve and other jacket-type elements having a length that is greater than a corresponding width or thickness so as to be 'elongate' in an axial direction of the heater. Reference to such 'elongate' elements and blocks encompasses bodies that are substantially continuously solid between their respective lengthwise ends and that do not comprise gaps, voids, spacings or other separations or between the lengthwise ends.

Preferably, the elongate jacket elements and elongate jacket blocks are substantially straight/linear bodies comprising at least one respective internal bore or channel to receive straight or linear sections of heating element. Accordingly, the present jacket elements and jacket blocks is configured to substantially encase surround, cover, house or contain the straight/linear sections of the heating element substantially along the length of the straight/linear sections between U-shaped bent or curved end sections of the heating element. Accordingly, it is preferred that the bent or curved sections of the heating element project only from and are not covered or housed by the heating element/jacket block.

Accordingly, reference within this specification to 'jacket' element and 'jacket' block encompass respective hollow bodies to contain, house, surround or jacket a heating element substantially continuously between the bent or curved end sections of the heating element that project from the respective lengthwise ends of the jacket element/block.

The effect of elongate jacket element and jacket block having a corresponding axially elongate internal bore or channel is to maximise the efficiency of thermal energy transfer between the heating element and the fluid flowing through the bore or channel in close confinement around the heating element. The lengthwise elongate configuration of the heating element and block provides that the flowing fluid is appropriately contained within the bore or channel around the heating element substantially the full length of the straight/linear section of heating element.

Within this specification, reference to the respective first and second lengthwise ends of a heating element that emerge from the bores or channels within the elongate heating element/jacket block, may be considered to be distinguished from the straight/linear sections of heating element that are housed continuously within the bore or channel of the element/block. As will be appreciated, almost all of the thermal transfer between heating element and fluid occurs within the elongate bore(s) or channel(s).

Preferably, the at least one jacket element (jacket block) comprises a non-electrically conducting material. Optionally, the jacket element (jacket block) is formed exclusively from a refractory or a ceramic material. Optionally, the jacket element may comprise a core material that is at least partially surrounded or encased by a refractory or a ceramic (i.e., non-electrically conducting) material formed as a coating at the external region of the jacket element and within each elongate bore or channel. Accordingly, the jacket element (jacket block) is configured to be heat resistant and electrically insulating.

Preferably, the heater comprises a plurality of the jacket elements assembled together as a unitary body and at least partially surrounded by spacers (that extend between the surrounding casing and the jacket block). The jacket elements are assembled and bound together as an assembly optionally via the spacers and/or other support members positioned at different regions along the length of the jacket block so as to positionally secure the jacket block relative to the casing and other components of the electric heater.

Optionally, the casing (alternatively termed a sheath) comprises a generally hollow cylindrical or hollow cuboidal shape encapsulating the heating assembly. Preferably, the spacers are attached to a radially inner surface of the casing. Optionally, the spacers may be welded to the inner surface of the casing for ease of manufacturing and to impart a structural strength to the heater. Accordingly, the spacers may be considered to form part of the casing.

Reference within this specification to 'heating element' encompasses relatively thin wires and larger cross sectional heating elements. Such a heating element, rod, bar or wire may comprise an iron-chromium-aluminium (Fe—Cr—Al) alloy or a nickel-chromium-iron (Ni—Cr—Fe) alloy but other suitable alloys or materials could also be used. In many practical cases the maximum internal spacing between the heating element and the internal facing surface that defines each bore or channel is from 0.5 to 20 mm, but may also fall within a broader range between 0.2 mm and 50 mm. Optionally, in particular a thicker heating element could in turn comprise a bundle of individual rods or wires which are optionally intertwined or twisted together. With such embodiments, the above-mentioned internal spacing is defined by the internal spacing between the bundle of rods or wires relative to regions of the internal facing surface that defines each longitudinal bore or channel being furthest separated from the heating element.

Optionally, a width of each of the fins in a circumferential direction decreases in a direction towards the at least one heating element. Optionally, each of the fins may be generally wedged shaped in a cross sectional plane of the bores or channels. Optionally, in the cross sectional plane of the bores or channels, each fin may comprise a polygonal, rectangular, square, triangular or semi-circular cross sectional shape profile.

Preferably, in said cross sectional plane the internal facing surface comprises curved regions and linear or planar regions. In particular, the internal facing surface of the bores or channels between the fins in a circumferential direction is not continuously curved. The bores or channels positioned in a circumferential direction between the stabilising fins project radially outward beyond an imaginary circle centred on and extending around the heating element (positioned within each bore or channel). Relative to this imaginary circle, each channel may be considered to be enlarged having a greater cross sectional area (by extending radially outward beyond the imaginary circle) so as to increase the available volume for the through-flow of gas. This configuration is beneficial to both enhance the energy transfer and heating capacity of the subject invention whilst reducing localised temperature deviation along the length of the heating element.

Optionally, the linear or planar regions of the internal facing surface represent regions of an imaginary polygon surrounding the at least one heating element, the imaginary polygon being interrupted in the circumferential direction by the fins. Optionally, in the circumferential direction, the curved regions are located at the position centrally between the adjacent fins and flanked at either side by the respective linear of planar regions. Preferably, in said cross sectional plane, a shape of the internal facing surface between the fins in a circumferential direction is non-continuously curved. Preferably, in said cross sectional plane, a shape of the internal facing surface between the fins in a circumferential direction is not formed exclusively by an arc of a circle having a radius larger than a radius of the at least one heating element. The leaf or petal shaped configuration of the bores or channels around the heating element controls the flow of gas and prevents undesirable localised heating variations.

Preferably, the fins extend over a majority of a length of each bore or channel between the first and second lengthwise ends. Preferably, the fins extend over a full length of each of the bores or channels between the first and second lengthwise ends. Preferably, each of the fins comprise the same depth in a radial direction towards the at least one heating element. Optionally, each of the fins project radially inward from a planar region of the internal facing surface. Preferably, in the cross sectional plane, each of the fins comprise a wedge shape profile with a thinnest part of each wedge positioned radially closest to the at least one heating element.

Optionally, the heater may comprise three, four, five or six fins projecting radially inward at each respective bore or channel. However, it will be possible to have more than six fins as the number of fins will depend on the design. Thus, as will be appreciated, any number of fins may be provided to achieve the desired directing of the flow of gas flowing through the heater, to centralise the heating element and to prevent undesirable temperature gradients around the heating element. The fins may be linear along their length or may be bent, curved or follow a non-linear direction along the length of the bores or channels. Optionally, the fins may be helical or part helical along their length between the respective ends of the heating element/jacket block.

Optionally, the electric heater may further comprise a casing positioned to at least partially surround the heating assembly and the casing comprises an outer sheath and a plurality of spacers extending radially between the outer sheath and the jacket block. Optionally, the spacers comprise a part-disc shaped member having a central aperture through which a part of the jacket block extends. Preferably, the heater may further comprise a plurality of the jacket elements assembled together as a unitary body and at least partially surrounded by the spacers. Optionally, the elongate jacket block may comprise a single elongate jacket element having the plurality of longitudinal bores or channels extending through the jacket block.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
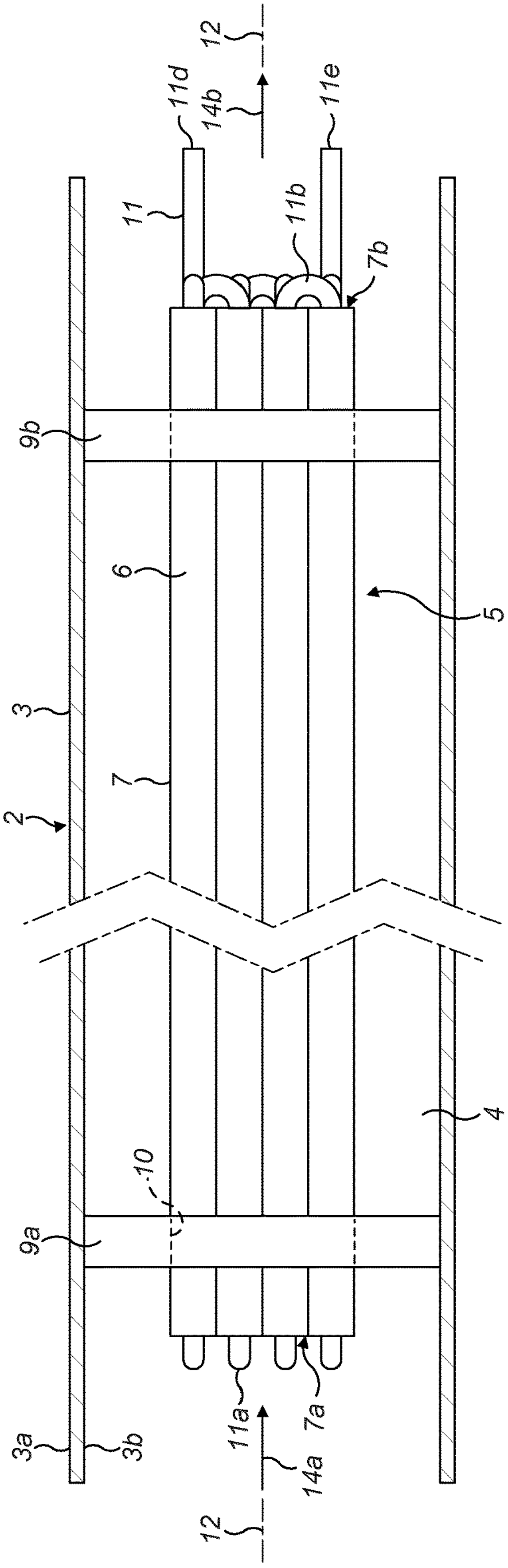
FIG. 1 is a cross sectional side view of a heating assembly within an electric heater according to one aspect of the present invention.
Figure 2:
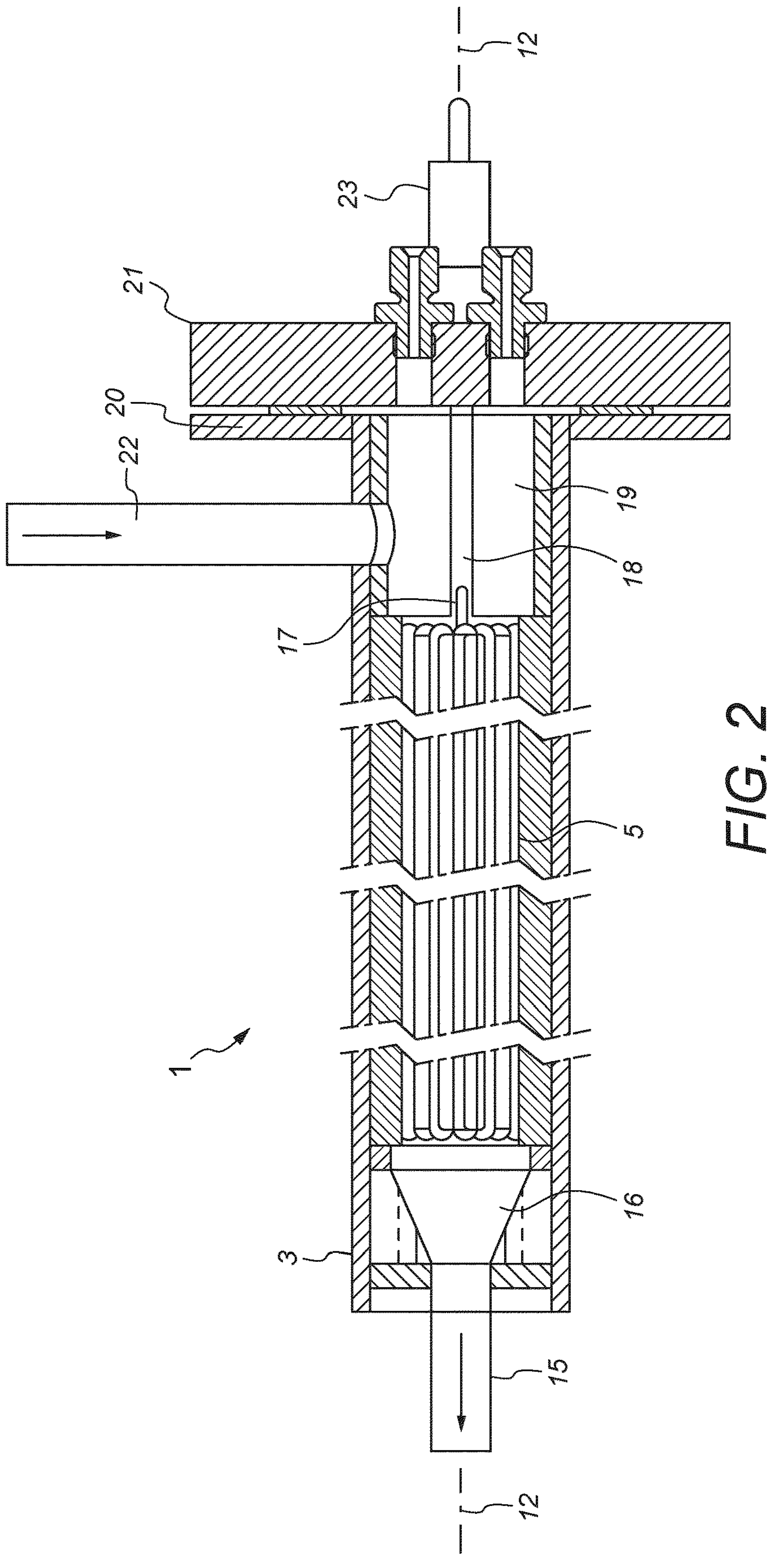
FIG. 2 is a further cross sectional side view of an electric heater incorporating the heating assembly of FIG. 1.

Referring to FIGS. 1 and 2, an electric heater 1 comprises a casing 2 in the form of a tubular sheath or housing 3 (having internal and external facing surfaces 3*b*, 3*a*, respectively) that defines an internal chamber 4 open at both axial ends. The heater 1 comprises a gas feed tube 22, a gas outlet nozzle 16 with inlet tube 15 and a fixing flange 20 mounted to a current feed flange 21. Gas feed tube 22 opens into a cylindrical cavity 19 through which extends parallel current connecting tubes 18 (only one tube shown). The current connecting tubes 18 form a passage for the connection of the ends of an electric heating element 11 mated with electrical connecting flange 21 from which extends external electrical connections 23. A centering extension 17 (that may be part of the heating element) projects into tube 18 to assist stabilisation of the heating assembly 5.

A heating assembly indicated generally by reference 5 is mounted within chamber 4 and is formed from a plurality of lengthwise elongate jacket elements 6 assembled and held together to form a lengthwise elongate jacket block 7. Each elongate jacket element 6 comprises a lengthwise extending longitudinal internal bore or channel 8 extending the full length of each jacket element 6 so as to be open at a first and second axial end 7*a*, 7*b* of the jacket block 7. The jacket element 6 and jacket block 7 are formed as hollow bodies in which the solid mass and volume extends continuously between the first and second axial ends 7*a*, 7*b*. That is, the jacket elements 6 and jacket blocks 7 are not discontinuous between respective ends 7*a*, 7*b*. Such an arrangement is advantageous to maximise the extent and efficiency of thermal energy transfer within the respective jacket elements 6 as explained in further detail herein.

Jacket block 7 is mounted in position (within casing 2) via a pair of disc-shaped spacers 9*a*, 9*b* positioned in a lengthwise direction towards each jacket block axial end 7*a*, 7*b*. Sheath 3 and spacers 9*a*, 9*b* may be formed from metal such that spacers 9*a*, 9*b* are secured to an internal facing surface 3*b* of sheath 3 via welding. Each spacer 9*a*, 9*b* comprises a central aperture 10 having a rectangular shape profile and dimensioned to accommodate jacket block 7 that also comprises an external generally cuboidal shape profile. Accordingly, jacket block 7 is mounted within each spacer aperture 10 so as to be suspended within chamber 4 and spatially separated from sleeve internal facing surface 3*b*.

Figure 3:
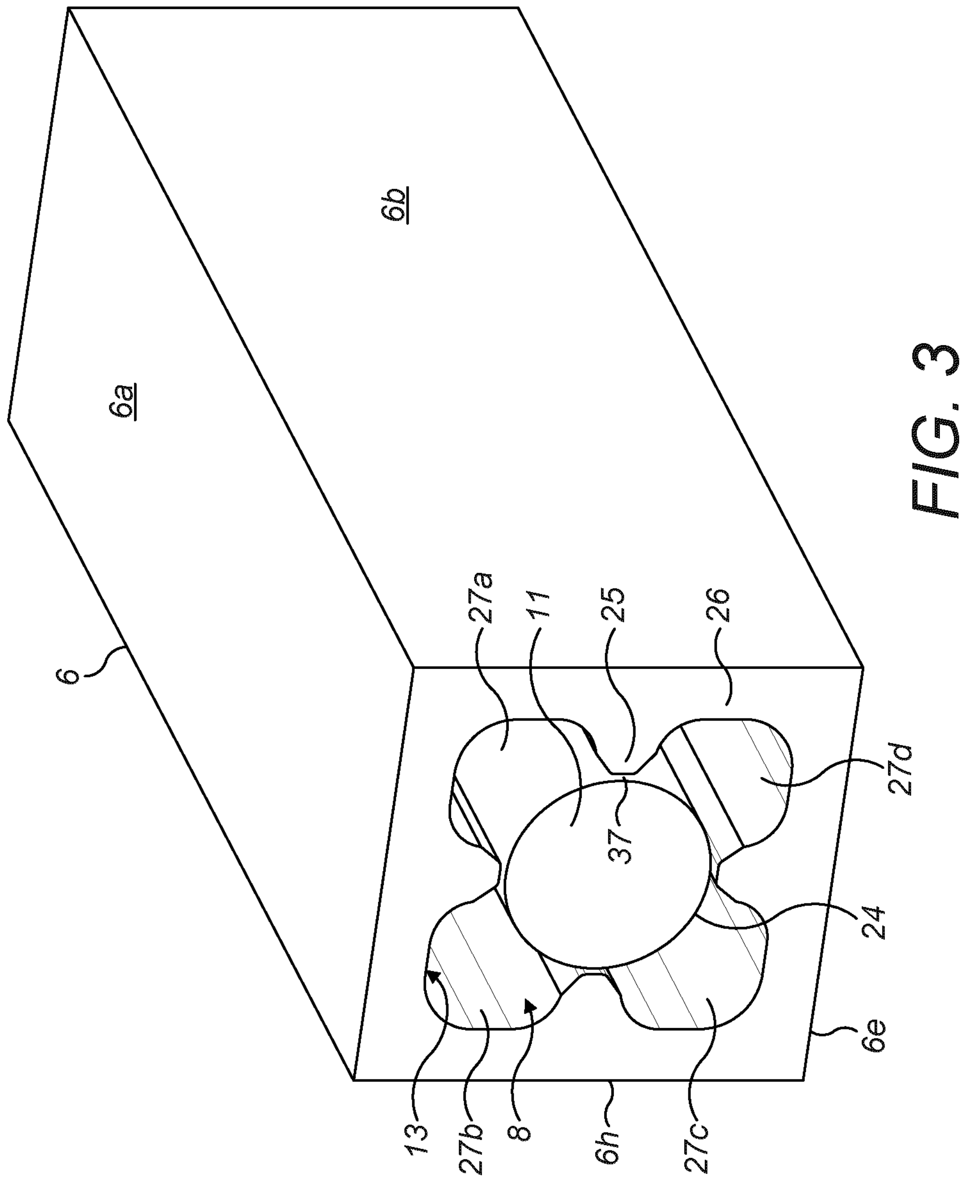
FIG. 3 is a cross sectional perspective view of a part of a jacket element surrounding a heating element/wire according to one aspect of the present invention.

A heating element indicated generally by reference 11 is formed as an elongate wire (or rod) having respective ends 11*d*, 11*e* projecting generally from one of the axial ends of jacket block 7. Ends 11*d*, 11*e* are illustrated in FIGS. 1 to 3 projecting from the 'hot' end 7*b* of the jacket block 7 for illustrative purposes. Ends 11*d*, 11*e*, preferably extend from the 'cool' end 7*a* of jacket block 7. Heating element 11 comprises a generally circular cross sectional profile and is dimensioned slightly smaller than the cross-sectional area of each jacket element bore or channel 8. The single heating element 11 is adapted to extend sequentially through each elongate bore or channel 8 of the jacket block 7 via respective bent axial end sections 11*a* and 11*b*. In particular, heating element 11 emerges from one bore or channel 8 of a first jacket element 6 is bent through 180° (heating element end section 11*a*) so as to return into an adjacent or neighbouring bore or channel 8 at the jacket block first axial end 7*a*. This is repeated at the jacket block second axial end 7*b* via bent end sections 11*b*. Heating element ends 11*d*, 11*e* are capable of being coupled to electrical connections (via connector 23) to enable a current to be passed through element 11 as will be appreciated.

Referring to FIG. 3, each jacket element 6 comprises four longitudinal extending side faces 6*a*, 6*b*, 6*e* and 6*h* that are generally planar such that each jacket element comprises an external generally square cross sectional shape profile adapted to enable the jacket elements to sit together in touching contact to form a rectangular cuboidal unitary body in which the individual side faces of the jacket elements 6 form the external facing surfaces of the jacket block 7. A small gap is provided between each spacer aperture 10 and the external surfaces of jacket block 7 (defined by jacket element side faces 6*a*, 6*b*, 6*e*, 6*h*). Such gaps accommodated differential thermal expansion of the spacers 9*a*, 9*b* (typically formed from metal) and the jacket elements 6 that are preferably formed from a non-electrically conducting refractory material. However, at least some structural support of the jacket block 7 and heating element 11 is provided by spacers 9*a*, 9*b* (via apertures 10) that are at least partially in contact with jacket block 7.

As will be appreciated, the dimensions of the heating element 11 and bores or channels 8 are carefully controlled to achieve a desired small separation gap between an inward facing surface 13 of each bore or channel 8 and an external surface 24 of heating element 11. Such an arrangement is advantageous to maximise the effectiveness and efficiency of heat energy transfer from element 11 to a gas phase medium initially introduced into the chamber 4 at position 14*a* to then flow through each of the bore or channel 8 and exit from the heating assembly 5 at position 14*b*. This effectiveness and efficiency of heat energy transfer is also provided, in turn, by the heating elements 6 extending continuously lengthwise (axially) between respective ends 7*a*, 7*b*. In particular, heating element 11 is entirely and continuously housed, covered and contained by the elongate jacket elements 6 between ends 7*a*, 7*b*. When the electric heater 1 is suspended vertically in use, undesirable contact between the bent end sections 11*a*, 11*b* and the end faces 6*c*, and in particular the annular edges that define the entry and exit end of each bore or channel 8, contribute to fatigue and damage to the heating element 11 and a corresponding reduction in the service lifetime of the heater 1.

Figure 4:
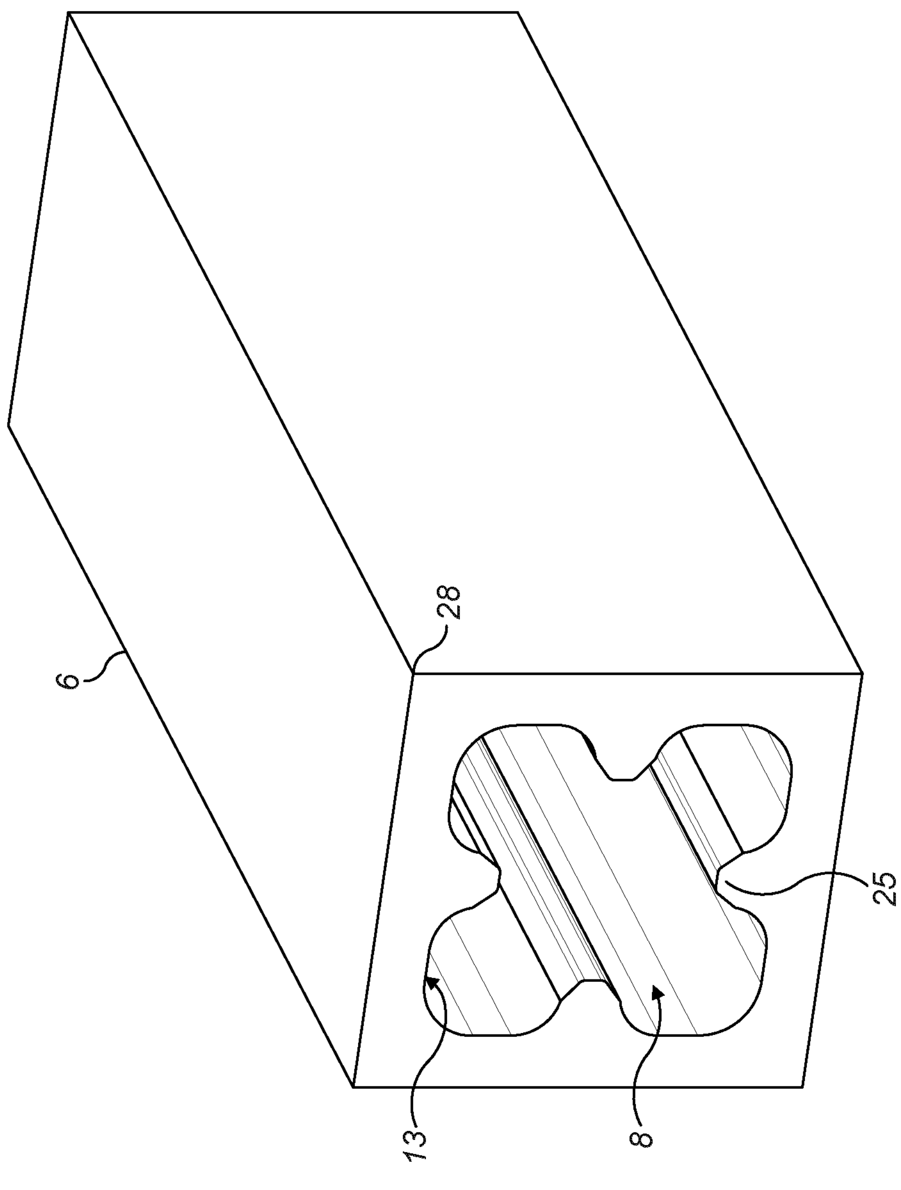
FIG. 4 is a cross sectional perspective view of jacket element of FIG. 3 without the heating element.
Figure 5:
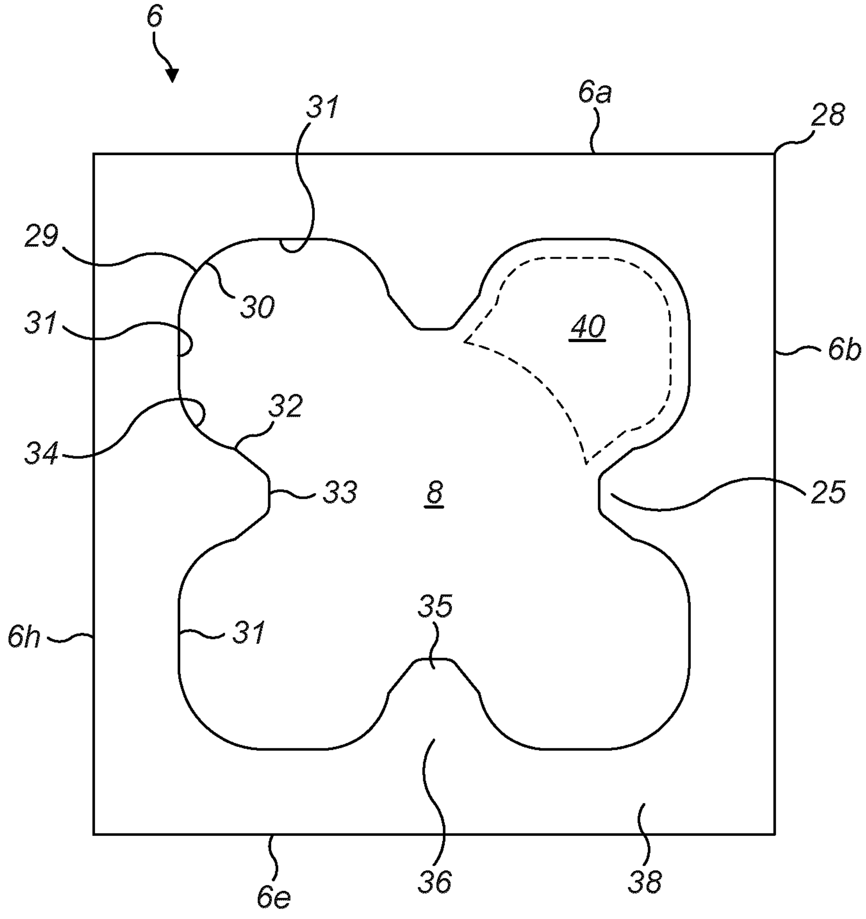
FIG. 5 is an end view of the jacket element of FIG. 4 without the heating element.

Advantageously and referring to FIGS. 3 to 5, the present electric heater 1 and in particular each jacket element 6 is provided with means to positionally stabilise and centre heating element 11 within each bore or channel 8. This centering and stabilisation is achieved via a set of stabilising fins indicated generally by reference 25, that extend longitudinally along and project radially into and towards a central region of each bore or channel 8. Fins 25 are adapted specifically to maintain centering of heating element 11 at the axial centre of each bore or channel 8 which in turn positionally stabilises heating element 11 and in particular the bent axial end sections 11*a*, 11*b* (that project axially beyond the respective end faces 7*a*, 7*b* of the jacket block 7). As will be appreciated, short circuiting of the electric heater 1 would occur if ends 11*a*, 11*b* were to contact one another resulting in complete failure of the electric heater 1. Bending and positional distortion of the heating element 11 within the elongate bore or channel 8 may result from localised heating around heating element 11 at regions between jacket block ends 7*a*, 7*b*. The present fins 25 project radially into the bore or channel 8 and are positioned in very close and almost touching contact with the heating element external surface 24. A small radial gap 37 is provided between a radially innermost end face 33 of each fin 25 and heating element external surface 24. Should heating element 11 distort radially, surface 24 may contact surface 33 to prevent further radial displacement and maintain centering of element 11 within bore or channel 8 to maintain the pre-defined separation of each of bent end sections 11*a*, 11*b*.

Figure 6:
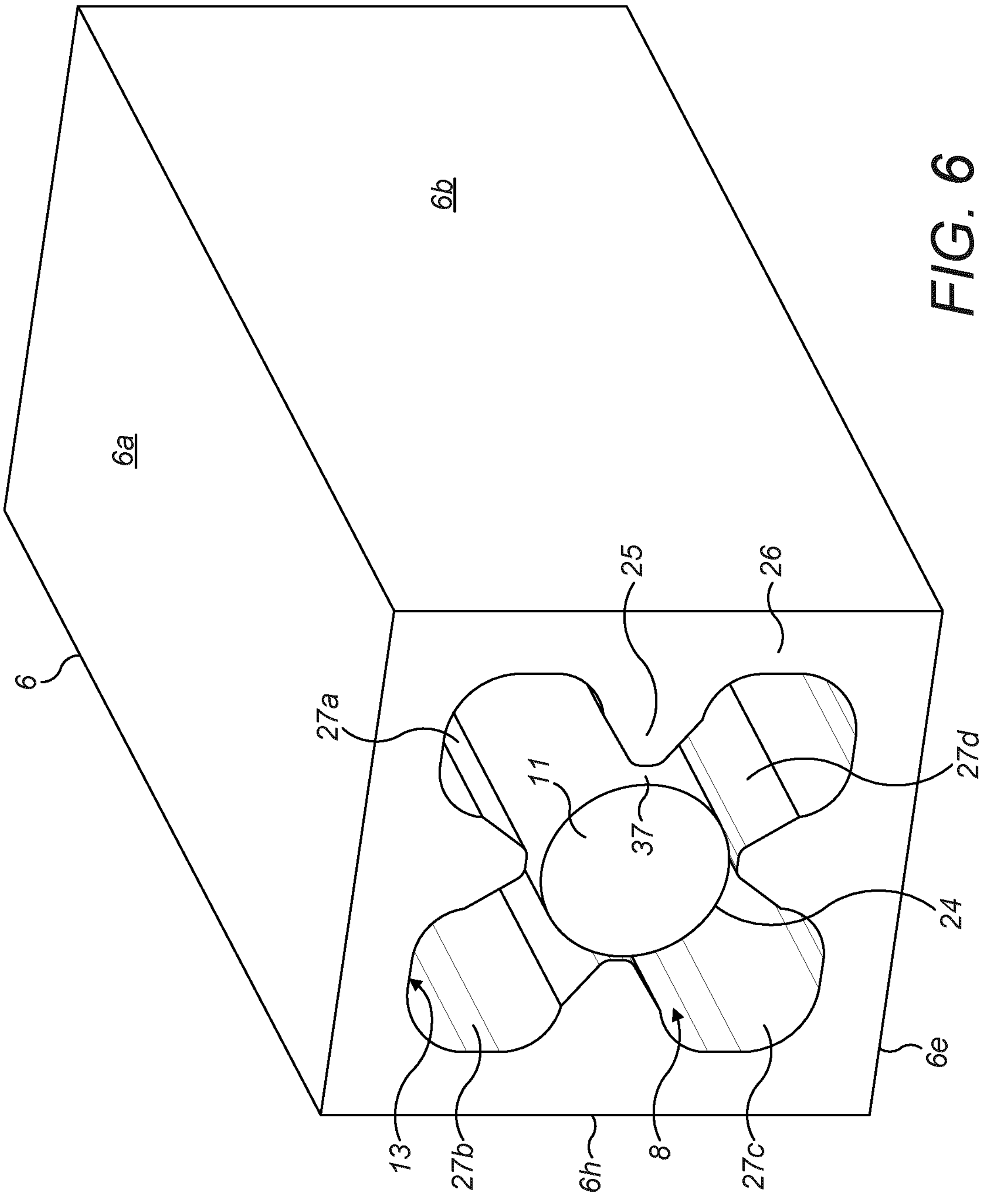
FIG. 6 is a cross sectional perspective view of a jacket element surrounding a heating element/wire according to a further specific implementation of the present invention.

According to the specific implementation of FIGS. 3 to 5 and also the further embodiment of FIG. 6, each internal bore or channel 8 may be considered to comprise a general square or rectangular cross sectional shape with the corners of the square/rectangle being rounded. The fins 25 project radially inward from each side face of the square/rectangle at a mid-position between the rounded corners. In particular, and referring to FIG. 5, each bore or channel 8 is defined by generally planar faces 31 (that would otherwise define the square or rectangular cross sectional shape) with each face 31 extending between the respective corners 29. Each internal (bore or channel) corner 29 is positioned radially inward from respective corners 28 provided at the external facing surface of each heating element 6. Each corner 29 comprises an arcuate section, bordered at each side in a circumferential direction around bore or channel 8 by neighbouring surfaces 31. Fins 25 project inwardly from neighbouring surfaces 31. Each fin 25 comprises a radially innermost end face 33 provided at an innermost tip 35 and tapering side faces 32 that projects outwardly from end surface 33 and mate with planar surfaces 31 via curved transition faces 34. Accordingly, each fin 25 is generally wedge shaped in the cross sectional plane. Transition faces 34 are positioned at a base 36 of each fin 25 that represent a region of a wall 38 of each jacket element 6. According to each specific embodiment, four fins 25 project inwardly from wall 38 towards an axial centre of each bore or channel 8. Each fin 25 is positioned approximately mid-way between each corner 29. Each fin 25 projects radially inward from wall 38 by an equal distance so that each of the gaps 37 is the same size. According to one embodiment, the surface area ratio is expressed as the cross sectional area of the heating element 11 divided by the cross sectional area of the bore or channel or cavity 8.

A set of gas-flow channels 40 are defined between each fin 25 in the circumferential direction around heating element. Each channel 40 is defined, in part, by the tapered side faces 32 of each fin 25, the transition faces 30, the planar faces 31, the arcuate corner surfaces 30 and the external surface 24 of heating element 11. The generally square or rectangular cross sectional profile of each bore or channel 8 (notwithstanding the presence of fins 25 and the rounding of the corners 29) serves to maximise the cross sectional surface area for the through flow of gas around heating element 11. This is important to maximise the energy transfer between heating element 11 and the flowing gas. This shape profile in addition to the presence of stabilising fins 25 is beneficial to control and direct the flow of the gas around the heating element 11 to avoid undesirable differential heating that would otherwise lead to bending and distortion of the heating element 11 in use. Stabilising fins 25 also provide a means of preventing large positional shifts of the heating element 11 within each bore or channel 8 as indicated. In the cross sectional plane of FIG. 5, the channels 40 may represent lobes 27*a*, 27*b*, 27*c*, 27*d* surrounding element 11 and having respective enlarged volumes to maximise the volume of the through flow of gas. This improves the heating capacity and efficiency of the electric heater 1. In particular, the inventors have identified that the specific shape profile of the inward facing surface 13 of each bore or channel 8 via the respective surfaces/faces 31, 30, 34 and 32 contribute to the uniform heating of the gas flowing around the heating element 11 and a minimising of undesirable temperature gradients of the heating element 11 within the bore or channel 8. In a cross sectional plane of each bore or channel, each of the lobes 27*a*, 27*b*, 27*c*, 27*d* may comprise a petal or leaf shape profile. As such, in the cross sectional plane, a separation distance between heating element surface 24 and bore or channel surface 13 and is non-uniform between each fin 25 in a circumferential direction around the heating element 11. The present arrangement is advantageous to provide an increased lateral stabilisation of the heating element 11 in a direction perpendicular to longitudinal axis 12 extending through heater 11. The heater having a positionally centred and stabilised heating element (within each bore or channel 8) is advantageous to minimise any movement in the bent axial end sections 11*a*, 11*b* and in turn extend the operational lifetime of the electric heater 1 and in particular the heating assembly 5 including jacket block 7.

As will be appreciated, whilst the subject invention is described with reference to a collection of heating elements 6 assembled together as a unitary body, the jacket block 7 may comprise a single body having a plurality of internal bores or channels 8 each provided with a shape profile and stabilisation fins 25 as described. The single jacket block 7 according to any such further implementations may be positionally stabilised within casing 2 via corresponding stabilising spaces 9*a*, 9*b* having appropriately sized apertures 10.

The invention claimed is:

1. An electric heater to heat a flow of a fluid comprising:

at least one axially elongate jacket element defining an axially elongate jacket block having first and second lengthwise ends;

a plurality of longitudinal bores or channels extending internally through the jacket block and being open at each of the respective first and second lengthwise ends each of the bores or channels defined by an internal facing surface of the at least one jacket element; and at least one heating element extending axially through the bores or channels and having respective bent axial end sections such that the at least one heating element emerges from and returns into adjacent or neighbouring bores or channels at one or both the respective first and second lengthwise ends, the at least one heating element and the jacket block forming a heating assembly, wherein at least three fins project radially inward from the at least one jacket element towards the at least one heating element within each of the bores or channels, wherein in a cross sectional plane through the jacket block, a radial separation distance between the internal facing surface of each bore or channel and an external facing surface of the at least one heating element is at a maximum at a position centrally between adjacent fins in a circumferential direction, and wherein in said cross sectional plane the internal facing surface comprises curved regions and linear or planar regions.

2. The electric heater as claimed in claim 1, wherein a width of each of the fins in a circumferential direction decreases in a direction towards the at least one heating element.

3. The electric heater as claimed in claim 1, wherein the curved regions are located at the position centrally between the adjacent fins and flanked at either side by the respective linear or planar regions.

4. The electric heater as claimed in claim 1, wherein the cross-sectional surface area ratio is between 0.12 to 0.72.

5. The electric heater as claimed in claim 1, wherein in said cross sectional plane, a shape of the internal facing surface between the fins in a circumferential direction is non-continuously curved.

6. The electric heater as claimed in claim 1, wherein in said cross sectional plane, a shape of the internal facing surface between the fins in a circumferential direction is not formed exclusively by an arc of a circle having a radius larger than a radius of the at least one heating element.

7. The electric heater as claimed in claim 1, wherein the fins extend over a majority of a length of each bore or channel between the first and second lengthwise ends.

8. The electric heater as claimed in claim 7, wherein the fins extend over a full length of each of the bore or channels between the first and second lengthwise ends.

9. The electric heater as claimed in claim 1, wherein in the cross sectional plane, each of the fins comprise a wedge shape profile with a thinnest part of each wedge positioned radially closest to the at least one heating element.

10. The heater as claimed in claim 9, comprising a plurality of the jacket elements assembled together as a unitary body and at least partially surrounded by the spacers.

11. The electric heater as claimed in claim 1, wherein a maximum internal spacing between the at least one heating element and the internal facing surface that defines each bore is between 0.5 and 20 mm.

12. The heater as claimed in claim 1, wherein the at least one jacket element comprises a non-electrically conducting material.

13. The heater as claimed in claim 1, further comprising a casing positioned to at least partially surround the heating assembly and the casing comprises an outer sheath and a plurality of spacers extending radially between the outer sheath and the jacket block.

14. The heater as claimed in claim 1, wherein the elongate jacket block comprises a single elongate jacket element having the plurality of longitudinal bores or channels extending through the jacket block.

15. An electric heater to heat a flow of a fluid comprising:

at least one axially elongate jacket element defining an axially elongate jacket block having first and second lengthwise ends;

a plurality of longitudinal bores or channels extending internally through the jacket block and being open at each of the respective first and second lengthwise ends each of the bores or channels defined by an internal facing surface of the at least one jacket element; and at least one heating element extending axially through the bores or channels and having respective bent axial end sections such that the at least one heating element emerges from and returns into adjacent or neighbouring bores or channels at one or both the respective first and second lengthwise ends, the at least one heating element and the jacket block forming a heating assembly, wherein at least three fins project radially inward from the at least one jacket element towards the at least one heating element within each of the bores or channels, wherein in a cross sectional plane through the jacket block, a radial separation distance between the internal facing surface of each bore or channel and an external facing surface of the at least one heating element is at a maximum at a position centrally between adjacent fins in a circumferential direction, and wherein in said cross sectional plane, a shape of the internal facing surface between the fins in a circumferential direction is non-continuously curved.

16. The electric heater as claimed in claim 15, wherein a width of each of the fins in a circumferential direction decreases in a direction towards the at least one heating element.

17. The electric heater as claimed in claim 15, wherein the curved regions are located at the position centrally between the adjacent fins and flanked at either side by the respective linear or planar regions.

18. The electric heater as claimed in claim 15, wherein the fins extend over a majority of a length of each bore or channel between the first and second lengthwise ends.

19. The electric heater as claimed in claim 15, wherein in the cross sectional plane, each of the fins comprise a wedge shape profile with a thinnest part of each wedge positioned radially closest to the at least one heating element.

20. An electric heater to heat a flow of a fluid comprising:

at least one axially elongate jacket element defining an axially elongate jacket block having first and second lengthwise ends;

a plurality of longitudinal bores or channels extending internally through the jacket block and being open at each of the respective first and second lengthwise ends each of the bores or channels defined by an internal facing surface of the at least one jacket element; and at least one heating element extending axially through the bores or channels and having respective bent axial end sections such that the at least one heating element emerges from and returns into adjacent or neighbouring bores or channels at one or both the respective first and second lengthwise ends, the at least one heating element and the jacket block forming a heating assembly, wherein at least three fins project radially inward from the at least one jacket element towards the at least one heating element within each of the bores or channels, wherein in a cross sectional plane through the jacket block, a radial separation distance between the internal facing surface of each bore or channel and an external facing surface of the at least one heating element is at a maximum at a position centrally between adjacent fins in a circumferential direction, and wherein in said cross sectional plane, a shape of the internal facing surface between the fins in a circumferential direction is not formed exclusively by an arc of a circle having a radius larger than a radius of the at least one heating element.

21. The electric heater as claimed in claim 20, wherein a width of each of the fins in a circumferential direction decreases in a direction towards the at least one heating element.

22. The electric heater as claimed in claim 20, wherein the curved regions are located at the position centrally between the adjacent fins and flanked at either side by the respective linear or planar regions.

23. The electric heater as claimed in claim 20, wherein the fins extend over a majority of a length of each bore or channel between the first and second lengthwise ends.

24. The electric heater as claimed in claim 20, wherein in the cross sectional plane, each of the fins comprise a wedge shape profile with a thinnest part of each wedge positioned radially closest to the at least one heating element.

* * * * *